United States Patent [19]
Moss

[11] 3,818,669
[45] June 25, 1974

[54] FLEXIBLE JOINT

[75] Inventor: Charles W. Moss, Ann Arbor, Mich.

[73] Assignee: Tension Structures, Inc., Milan, Mich.

[22] Filed: Mar. 1, 1972

[21] Appl. No.: 230,808

Related U.S. Application Data

[62] Division of Ser. No. 32,051, April 27, 1970, Pat. No. 3,675,380.

[52] U.S. Cl. .................................................. 52/582
[51] Int. Cl. ............................ E04b 1/32, E04h 1/02
[58] Field of Search ........... 287/189.36 R, 189.36 S, 287/20.92 J, 20.92 W; 52/80, 82, 403, 400, 468, 285, 582, 459, 495

[56] References Cited
UNITED STATES PATENTS

| | | |
|---|---|---|
| 2,186,937 | 1/1940 | Lohrman .............................. 52/400 |
| 2,348,937 | 5/1944 | Stahl .................................... 52/400 |
| 2,820,990 | 1/1958 | Johnson .............................. 52/82 X |
| 3,028,938 | 4/1962 | Schorr ................................ 52/400 X |
| 3,191,727 | 6/1965 | Schmeltz et al. ...................... 52/403 |

Primary Examiner—Thomas F. Callaghan
Attorney, Agent, or Firm—Olsen and Stephenson

[57] ABSTRACT

A shelter which has panels bowed and secured together in a stressed condition to define a domelike building. An improved flexible joint is provided between the panels to aid in erecting and in retaining the structure together, and to provide a weather seal. A method of erecting the shelter and inserting the flexible joints in place is disclosed.

3 Claims, 10 Drawing Figures

PATENTED JUN 25 1974
3,818,669
SHEET 1 OF 2
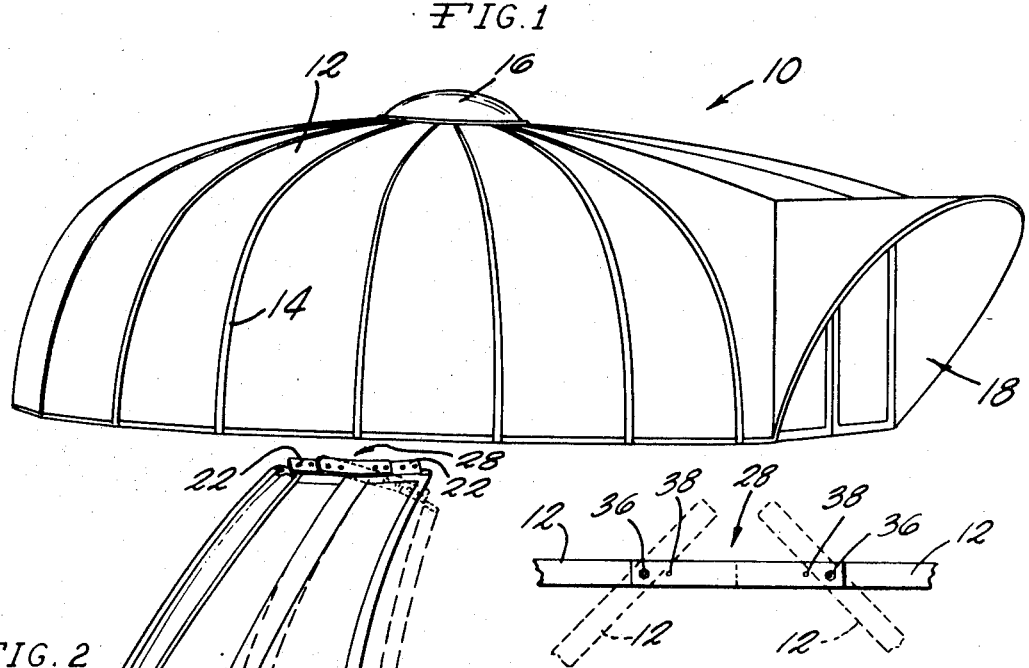
FIG.1
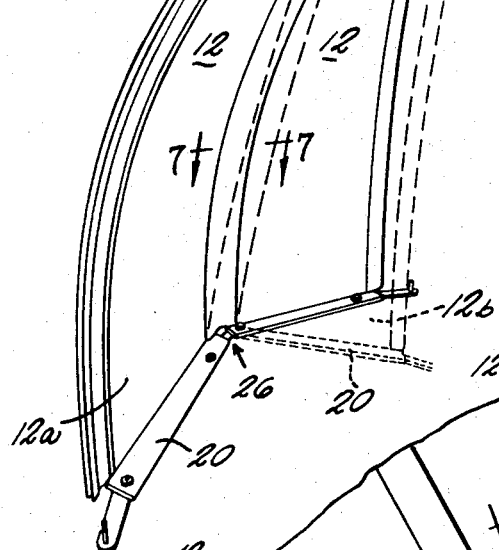
FIG.2
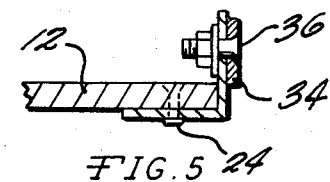
FIG.3
FIG.5
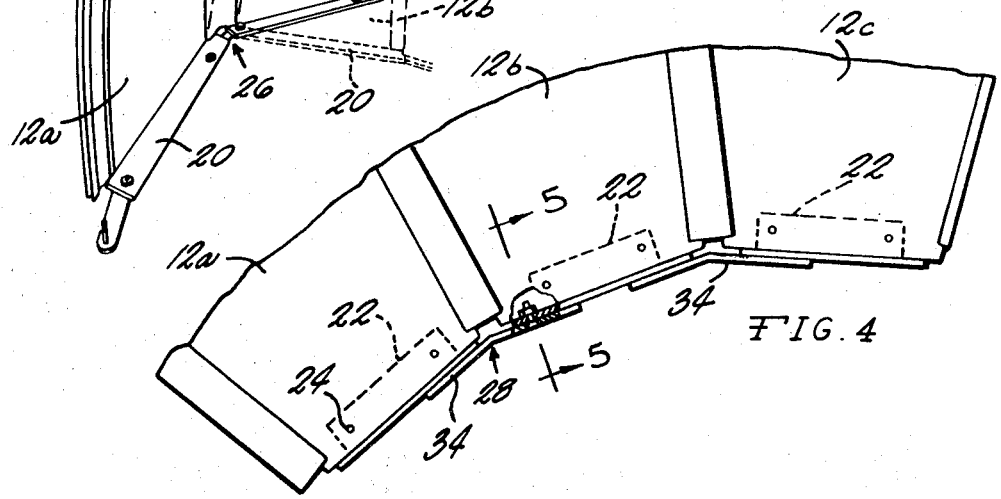
FIG.4

FLEXIBLE JOINT

CROSS REFERENCE TO RELATED APPLICATION

The present application is directed to improvements over the method and apparatus disclosed in pending application Ser. No. 790,930, filed Jan. 14, 1969 for "Prefabricated Shelter and Method of Erecting Same," now U.S. Pat. No. 3,562,975, issued Feb. 16, 1971. This application also is a division of pending application Ser. No. 32,051, filed Apr. 27, 1970, now U.S. Pat. No. 3,675,380, issued July 11, 1972.

BACKGROUND OF THE INVENTION

The present invention relates to improved flexible joints that secure adjacent panels together.

One of the early shelters which is constructed by bowing and securing together a plurality of prestressed panels so as to define a domelike structure which is free of internal supporting structure is disclosed in French Patent No. 899,373. As there shown, the panels are secured together by overlapping the panels and then bolting them together, or by bolting bands to adjoining panels.

Another prior art shelter of this general character is disclosed in the U.S. Pat. No. 2,820,990, granted Jan. 28, 1958 to Johnson. As there shown, the panels are joined by clips and a cable is connected to the uppermost clip between each adjoining panel for retaining the upper ends of the panels together.

The shelters disclosed in the two cited references create many significant problems when an effort is made to erect them. Also, when such shelters are erected, problems exist with respect to providing proper weather seals at the joints between the panels.

The aforesaid U.S. Pat. No. 3,562,975 discloses a new dome-shaped shelter which includes a novel flexible joint and weather seal which is located between the panels, and the patent also discloses a new method of erecting a dome-shaped shelter.

SUMMARY OF THE INVENTION

The present invention relates to improvements in a prefabricated domelike shelter, and particularly in a flexible joint which is adapted to be positioned between stressed panels and locked in place during the erection of the shelter. The present invention also relates to improvements in the method of erecting the domelike shelter.

According to a preferred form of the present invention, a shelter is provided, comprising a plurality of resilient panels each having the general shape of an isosceles trapezoid with curvilinear sides. Each panel is mounted in an upright position at its base and is prestressed into a bowed position with its curvilinear edges substantially in abutting relationship throughout their lengths with respect to the curvilinear edges of the next adjacent panels. First means are provided securing the bottoms of adjacent panels together, and second means are provided securing the tops of such panels together. Flexible joints extend between the substantially abutting lateral edges the full lengths of the panels and overlap the inner and outer surfaces of such panels. Each lateral edge of a panel has a locking strip extending along its length, said strip and its associated flexible joint being interlocked when the flexible joint is in its overlapping position with respect to the panels.

A preferred embodiment of an interconnected flexible joint for use in the prefabricated shelter comprises a first extruded organic plastic U-shape strip defining a longitudinal channel with generally parallel sides. The first strip being fitted over the edge of one of the panels with the sides secured to inner and outer surfaces of the panel, and a second organic plastic U-shaped strip of similar construction is similarly fitted over the adjacent edge of the next panel. An extruded organic plastic H-shaped strip is provided defining longitudinal grooves having laterally projecting legs which straddle the U-shaped strips. The sides of the U-shaped strips that are located on the outer surfaces of the panels and the corresponding legs of the H-shaped strip have interlocking portions.

Accordingly, it is an object of the present invention to provide an improved dome-shaped shelter, and particularly to provide improved flexible joints connecting adjacent panels of the shelter.

Other objects of this invention will appear in the following description and appended claims, reference being had to the accompanying drawings forming a part of this specification wherein like reference characters designate corresponding parts in the several views.

BRIEF DESCRIPTION OF THE DRAWINGS.

FIG. 1 is a perspective view of a dome-shaped shelter embodying one form of the present invention;

FIG. 2 is an enlarged perspective view showing two panels joined together at a selected obtuse angle during the erection process, and showing in broken lines an initial position of one of the panels at a lesser angle during a step of positioning the panels together;

FIG. 3 is a schematic illustration showing two steps in the method of joining two panels together at their top portions;

FIG. 4 is a fragmentary top plan view of three panels that have been joined together during the erection of the shelter;

FIG. 5 is an enlarged fragmentary view taken on the lines 5—5 of FIG. 4;

Figure 6:
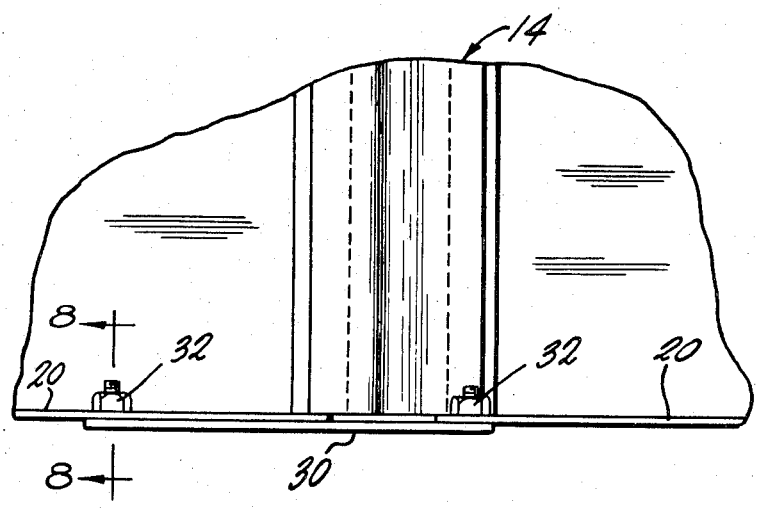
FIG. 6 is a fragmentary side elevational view showing bottom portions of two adjacent panels that have been joined together.
Figure 8:
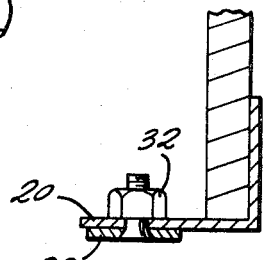
FIG. 8 is a fragmentary sectional view taken on the lines 8—8 of FIG. 6.

DESCRIPTION OF THE PREFERRED EMBODIMENTS.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawings, the invention will be described in greater detail. A preferred embodiment of a dome-shaped shelter 10 is shown in FIG. 1 in its assembled position. The shelter 10 includes a plurality of prestressed bowed panels 12 which had been cut to have a desired shape generally consisting of an isosceles trapezoid with curvilinear sides or edges, a plurality of flexible interlocking joints 14 fitted between adjacent panels 12, a cap member 16 which is seated on the upper ends of the panels 12, and an entranceway or doorframe assembly 18.

The panels 12 include a suitable resilient material, such as plywood or the like, and have the general shape when in an unstressed position of an isosceles trapezoid with curvilinear lateral or side edges, as is particularly described and explained in the aforesaid U.S. Pat. No. 3,562,975. As is also disclosed in that application, various other materials can be used, or various layers of material can be laminated together. For more detailed description of various types of materials and arrangements of material to form the panels, as well as for further descriptions of the general construction of the shelter, reference is made to the copending application.

Attached to each panel 12 to provide a bottom edge is an L-channel 20, which can be attached in any suitable manner, as by rivets, not shown. A similar L-channel 22 is secured to the top of each panel 12 by suitable means, such as rivets, 24.

Figure 7:
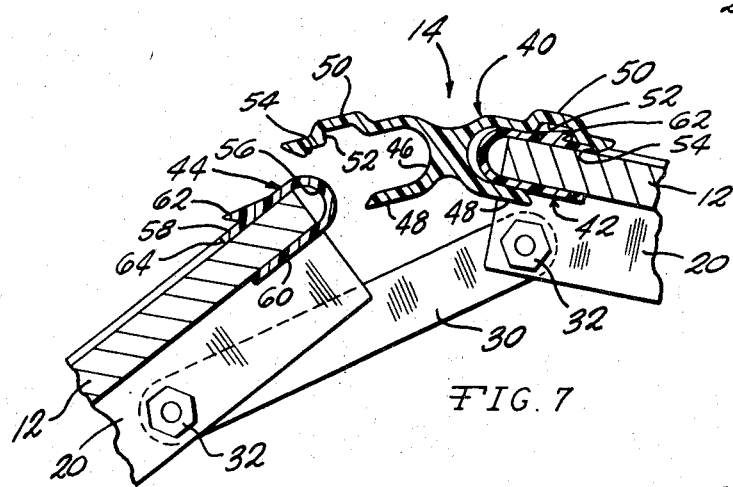
FIG. 7 is a fragmentary sectional view taken on the line 7—7 of FIG. 2 showing the one panel in its broken line position of FIG. 2.

When assembled, adjacent panels 12 are connected at their upper and lower ends by first and second means 26 and 28 which permit relative pivotal movement between the panels during one stage of their erection. The first means 26 comprises a hinge bracket or bar 30 which is secured to the respective L-channels 20 of the adjacent panels 12 by any type of suitable threaded studs and nuts 32. Preferably, the holes for the studs and nuts 32 are asymmetrically arranged as shown in FIG. 7 to facilitate pivoting the panels together. However, by virtue of providing a pivotal arrangement, whether symmetrical or asymmetrical, the one panel 12, shown in broken lines in FIG. 2, can be moved from the broken line position to the solid line position therein shown. The second means 28 also includes a hinge bracket or strap 34 which is adapted initially to be connected at the upper ends of the panels 12 by the volts 36 so that the panels 12 can be pivoted relative to one another from the broken line position to the solid line position shown in FIG. 3. Thereafter, when the panels are in the solid line position shown in FIG. 3, at a selected obtuse angle relative to one another to fit the dimensions of shelter 10, additional bolts can be inserted through the bolt holes 38 for rigidly securing the panels together with respect to the hinge strap 34.

In the illustrated embodiment, the flexible interlocking joints 14 are formed from three extruded strips 40, 42 and 44. The strips can be extruded from suitable organic plastic material such as polyvinyl chloride, which has resilient properties. The extruded strip 40 has a generally H-shaped cross section defining longitudinal grooves 46 between laterally projecting legs 48 and 50. The outer legs 50 each have a detent means or locking slot 52 extending lengthwise thereof and also an inturned shoulder 54 similarly extending lengthwise thereof. When the extruded strip 40 is in an unstressed condition, the included angle between the outwardly opening grooves 46 is less than 180 angular degrees and less than the included angle between adjacent panels 12 when in their final erected positions. For a more detailed explanation of the relationship of the strips 40 and the panels 12 during erection and final installation reference is made to prior U.S. Pat. No. 3,562,975.

Each of the U-shaped strips 42 and 44 defines a longitudinal channel 56 having generally parallel sides 58 and 60. The outer sides 58 of each U-shaped strip 42, 44 has a longitudinal barb or rib 62 which is adapted to fit into the locking slot 52 of the H-shaped strip 40. The outer extremities 64 of each U-shaped strip 42, 44 is located so that the corresponding inturned shoulder 54 of the H-shaped strip 40 can overlap such extremity 64.

For the purpose of fitting the interlocking joint 14 together, the U-shaped strips 42 and 44 will initially be bonded to the inner and outer surfaces of the panels 12, in the positions shown in FIG. 7. The H-shaped strip 40 can then be fitted onto the strip 44 to the position shown in FIG. 7. This is accommplished by pressing the H-shaped strip 40 over the U-shaped strip 44 so that the latter penetrates the longitudinal groove 46 somewhat like an arrowhead until the barb 62 penetrates and is locked in the locking slot 52. The inturned shoulder 54 will also be pressed over the extremity 64 of the U-shaped strip 44. Thereafter, by a method to be described, the other U-shaped strip 42 will also be interlocked into the other groove 46 of the H-shaped strip 40. When so interlocked, the H-shaped strip 40 will be in the interlocked position shown in FIG. 9 with respect to the two U-shaped strips 42 and 44, and the outer surface of the H-shaped strip 40 will be tensioned, especially by virtue of bowing of the panels 12, so as to oppose unlocking of the interlocked strips.

The method of erecting and joining together the panels 12 and of interconnecting the joints 14 will now be described in greater detail, with initial reference being made to FIG. 2. At the outset a first panel, such as panel 12a will be secured in an upright position to a supporting surface, and the first and second panels 12a and 12b will then be connected at their lower ends by the first means 26 at an angle less than said obtuse angle. This can readily be accomplished by fitting the bracket 30 under the L-channels 20 and securing the threaded nuts 32 onto the bolts projecting up from the bracket 30 through appropriate holes in the L-channel 20. While performing this function, the panel 12b can be in the broken line position shown in FIG. 2, and the H-shaped strip 40 will have been press fitted onto the edge of panel 12b as previously described. Next, the panels 12a and 12b are pivotally connected at their upper ends by means of the bolts 36, FIG. 3, and this can readily be facilitated by bowing as well as pivoting the panels relative to one another. At the same time that this is being done, the U-shaped strip 44 which is located on channel 12a will be pressed into the channel 46 of the H-shaped strip 40 at both the upper and lower ends thereof. Then, by pivotally moving the panel 12b at least to its proper position defined by the aforesaid obtuse angle, as shown in solid lines in FIG. 2, the U-shaped strip 42 can be fitted into the H-shaped strip 40 throughout the remainder of the length thereof and the bolts, not shown, can then be fitted through the holes 38 of the strap 34 to finish securing the upper ends of the panels 12 together. The straps 34 and the L- channels 22 will, when all are joined together, define a rigid, continuous strap or ring around the top portions of the panels 12. The outer surfaces of the H-shaped strip 40 will then be in a state of tension overlying the outer surfaces of the U-shaped strips 42 and 44 to provide a strong weathertight joint, especially where the inturned shoulders 54 overlie the extremities 64. The same sequence can then be carried out in joining a panel 12c to panel 12b, and this operation can be repeated with each succeeding panel until all of the panels have been erected.

Figure 10:
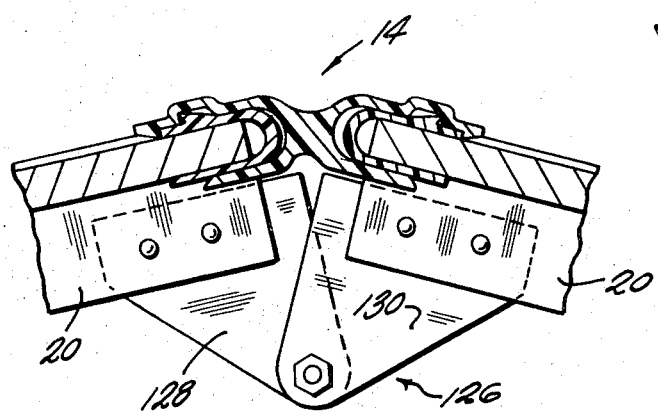
FIG. 10 is a view similar to FIG. 9, but showing a modified form of a hinge joint for connecting the bottoms of the panels together.

The present invention can be carried out using various other types of hinge means 26 and 28 at the upper and lower ends of the panels 12. For example, a modified arrangement of the first means 26 is shown in FIG. 10. As there shown, a hinge means 126 is provided wherein a pair of brackets 128 and 130 are riveted to the L-channels 20, and a single threaded nut 130 is used to secure the brackets in hinged relationship.

Figure 9:
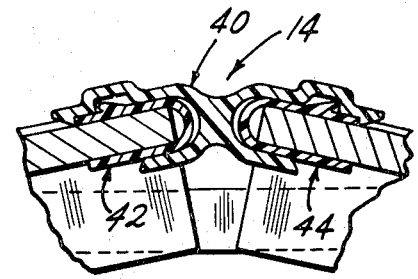
FIG. 9 is a fragmentary sectional view, similar to that of FIG. 7, showing the two panels secured together by the joining flexible strip.

It will be noted by reference to FIGS. 7, 9 and 10, that the interlocking arrangement between the U-shaped strips 42 and 44 and the H-shaped strip 40 permits the arrowheads or strips 42, 44 to be in a somewhat floating relationship within the grooves 46. This is a significant feature because it allows a limited amount of flexing of the dome structure so as to avoid stress concentrations in any specific location, which in turn could result in a structural failure.

It is claimed:

1. An interlocking joint connecting adjacent edges of two upright panels mounted at an obtuse angle with respect to one another to define inner and outer wall surfaces, each panel having a barb on its outer surface extending the full length of the panel in close proximity to and pointed away from its adjacent edge, each barb having a leading tapered surface extending inwardly toward its adjacent edge and a trailing tapered surface extending inwardly toward its adjacent edge, and an extruded organic plastic H-shaped strip defining longitudinal grooves between laterally projecting legs and a central base portion, said legs straddling said adjacent edges so that said adjacent edges fit into said grooves, the legs of each H-shaped strip that are located on the outer surfaces of the panels having detent means extending the length of the H-shaped strip, each said detent means overlapping its associated barb so that the barb is confined between the detent means and the base of the groove, the H-shaped strip being dimensioned so that when each detent means engages its barb a limited clearance exists in the groove between the adjacent edge of the panel and the central base portion of the groove to allow limited movement of the panels toward and away from one another.

2. The joint that is defined in claim 1, wherein the outer legs of said H-shaped strips have inturned shoulders at their extremities to provide a weather seal on the outer surfaces of the panels.

3. The joint that is defined in claim 1, wherein said detent means comprise locking slots extending lengthwise in the outer legs of said H-shaped strip into which said barbs are fitted.

* * * * *